（12） United States Patent
Wojciechowski

(10) Patent No.: US 9,970,760 B2
(45) Date of Patent: May 15, 2018

(54) REMOVABLE END CAP ASSEMBLY FOR A LEVEL

(71) Applicant: Johnson Level & Tool Mfg. Co., Inc., Mequon, WI (US)

(72) Inventor: Timothy J. Wojciechowski, Hubertus, WI (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 219 days.

(21) Appl. No.: 14/843,131

(22) Filed: Sep. 2, 2015

(65) Prior Publication Data

US 2016/0061604 A1   Mar. 3, 2016

Related U.S. Application Data

(60) Provisional application No. 62/045,230, filed on Sep. 3, 2014.

(51) Int. Cl.
*G01C 9/02*   (2006.01)

(52) U.S. Cl.
CPC ...................... *G01C 9/02* (2013.01)

(58) Field of Classification Search
CPC ...... G01B 5/008; G01B 11/005; G01B 11/25; G01B 21/045; G01B 11/03; G01B 5/004; G01C 9/26; G01C 9/34; G01C 9/02; G01C 9/00
USPC ......................... 33/365, 379, 451
See application file for complete search history.

(56) References Cited

U.S. PATENT DOCUMENTS

| 1,132,318 | A | * | 3/1915 | Feder | .................. | F16B 7/22 |
| | | | | | | 33/376 |
| 4,463,501 | A | | 8/1984 | Wright et al. | | |
| 650,992 | A | | 6/1990 | Sawyer | | |
| 5,412,876 | A | * | 5/1995 | Scheyer | .................. | G01C 9/28 |
| | | | | | | 33/350 |
| 5,709,034 | A | * | 1/1998 | Kohner | .................. | G01C 9/28 |
| | | | | | | 33/365 |
| 6,409,140 | B1 | | 6/2002 | Kratish et al. | | |
| 6,418,634 | B1 | | 7/2002 | Szumer | | |
| 6,430,827 | B2 | | 8/2002 | Ruther | | |

(Continued)

FOREIGN PATENT DOCUMENTS

| CN | 201059974 | 5/2008 |
| EP | 1126239 | 7/2006 |

OTHER PUBLICATIONS

PCT/US2015/048287, International Search Report and Written Opinion dated Dec. 7, 2015, 11 pages.

*Primary Examiner* — Yaritza Guadalupe-McCall
(74) *Attorney, Agent, or Firm* — Boyle Fredrickson, S.C.

(57) ABSTRACT

An end cap arrangement for a level, in which a frame of the level includes and end defining a recess and one or more engagement protrusions. The end cap arrangement includes an end cap body and a retainer that is movable between engaged and release positions. The retainer includes retainer structure that engages the engagement protrusions when the retainer is in the engaged position to prevent removal of the end cap body. The retainer also includes clearance structure that can be moved past the engagement protrusions to enable the end cap body to be removed from the level frame. The end cap arrangement may be used with either a box beam or I-beam level frame.

18 Claims, 13 Drawing Sheets

(56) References Cited

U.S. PATENT DOCUMENTS

| | | | |
|---|---|---|---|
| 6,675,490 B1 * | 1/2004 | Krehel | G01C 9/26 33/365 |
| 6,792,686 B2 | 9/2004 | Krehel et al. | |
| 6,988,320 B2 * | 1/2006 | Kallabis | G01C 9/26 33/365 |
| 7,150,106 B2 | 12/2006 | Kallabis et al. | |
| 7,536,797 B2 | 5/2009 | Steffens et al. | |
| 7,770,298 B1 * | 8/2010 | Wojciechowski | G01C 9/26 33/365 |
| 2001/0013176 A1 | 8/2001 | Ruther | |
| 2003/0163927 A1 * | 9/2003 | Kallabis | G01C 9/26 33/365 |
| 2005/0223577 A1 * | 10/2005 | Scarborough | G01C 9/28 33/379 |
| 2006/0248738 A1 | 11/2006 | Tran et al. | |
| 2007/0175056 A1 | 8/2007 | Tran et al. | |
| 2007/0234581 A1 | 10/2007 | Ming | |
| 2010/0000105 A1 | 1/2010 | Zhang et al. | |
| 2010/0000106 A1 | 1/2010 | Zhang et al. | |
| 2015/0300819 A1 * | 10/2015 | Pelletier | G01C 9/34 33/379 |
| 2016/0061604 A1 * | 3/2016 | Wojciechowski | G01C 9/02 33/301 |
| 2016/0138918 A1 * | 5/2016 | Neitzell | G01C 25/00 33/381 |

* cited by examiner

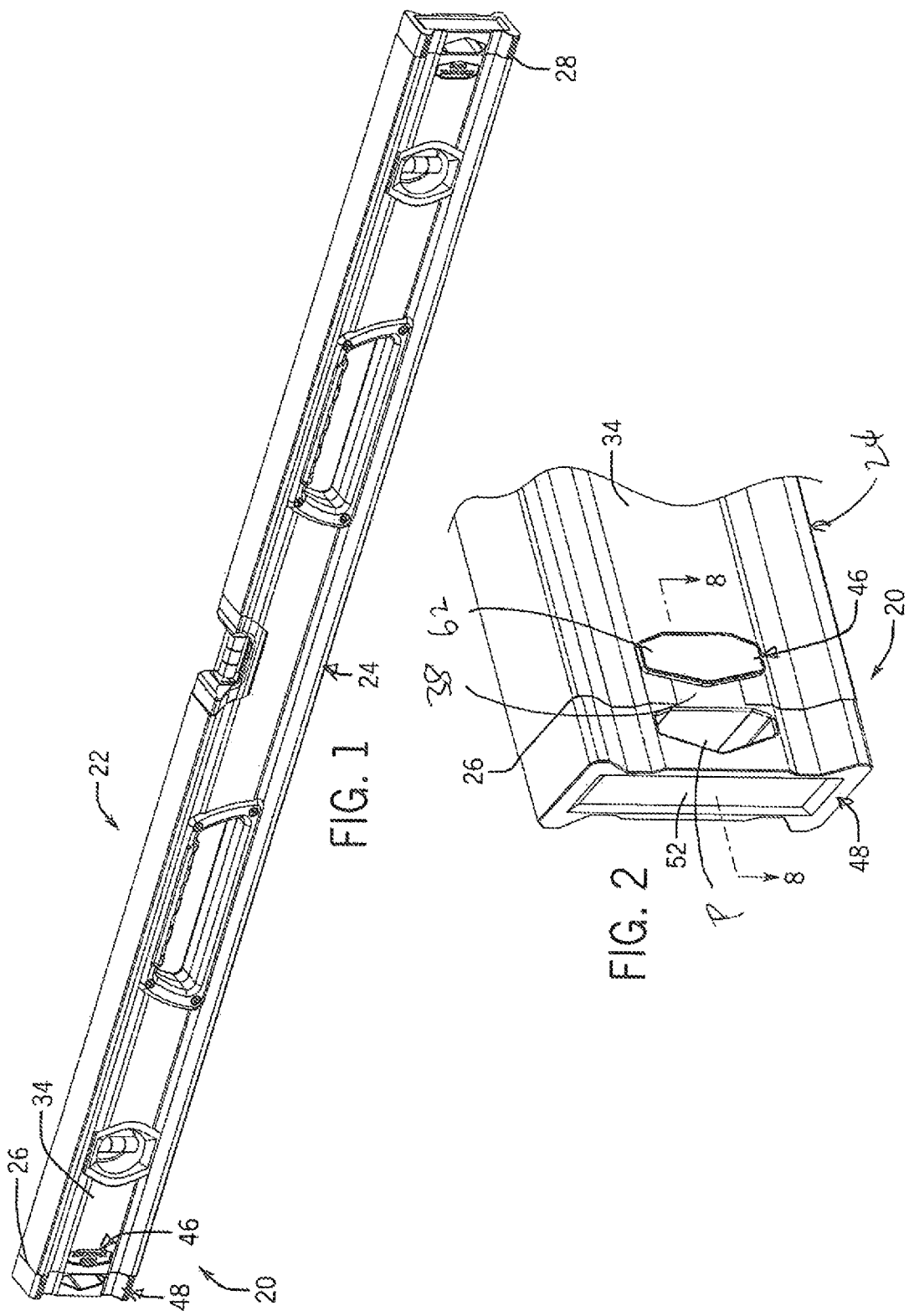

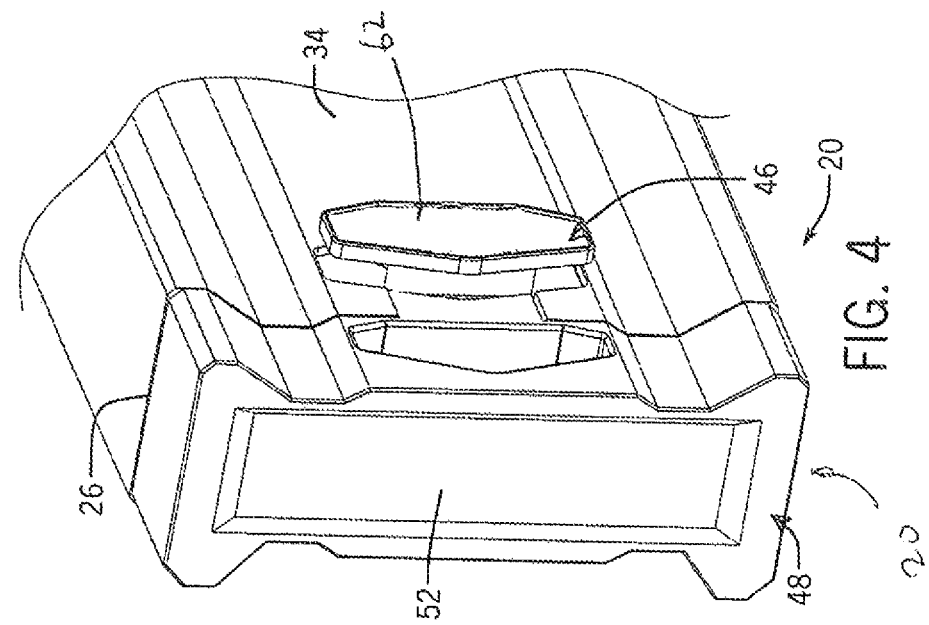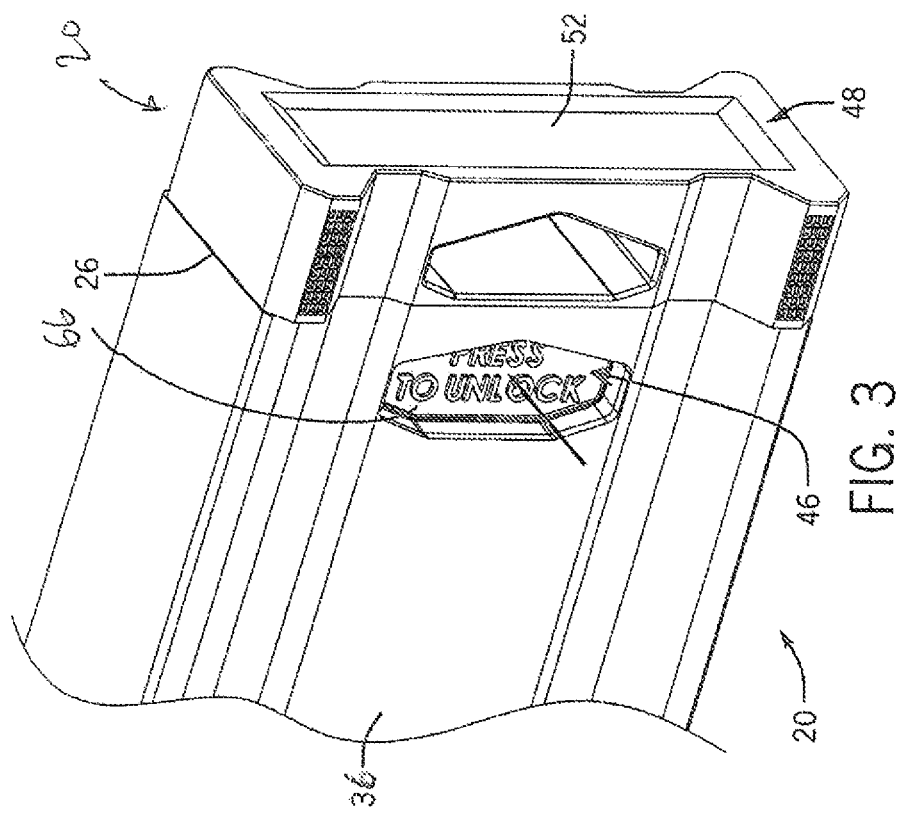

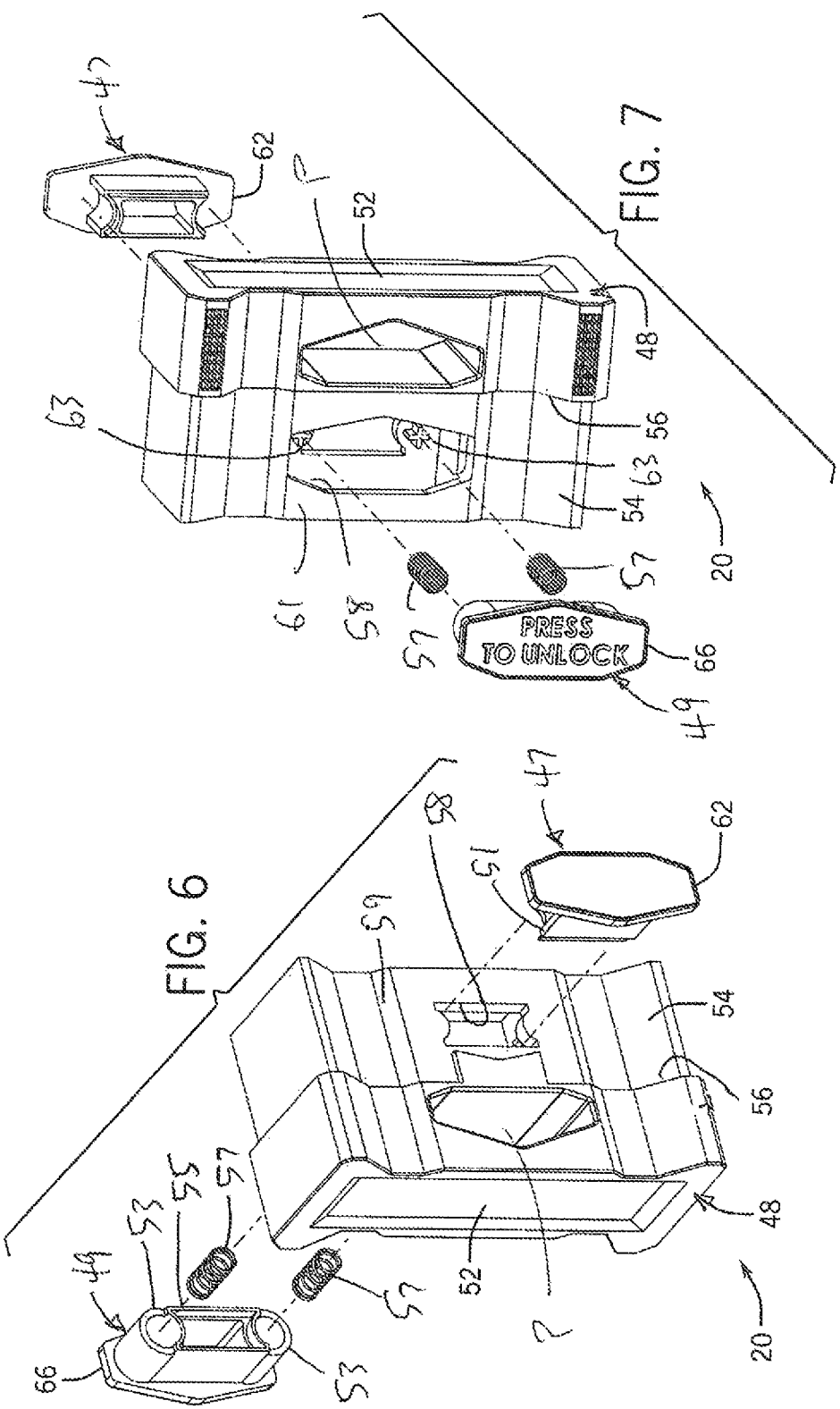

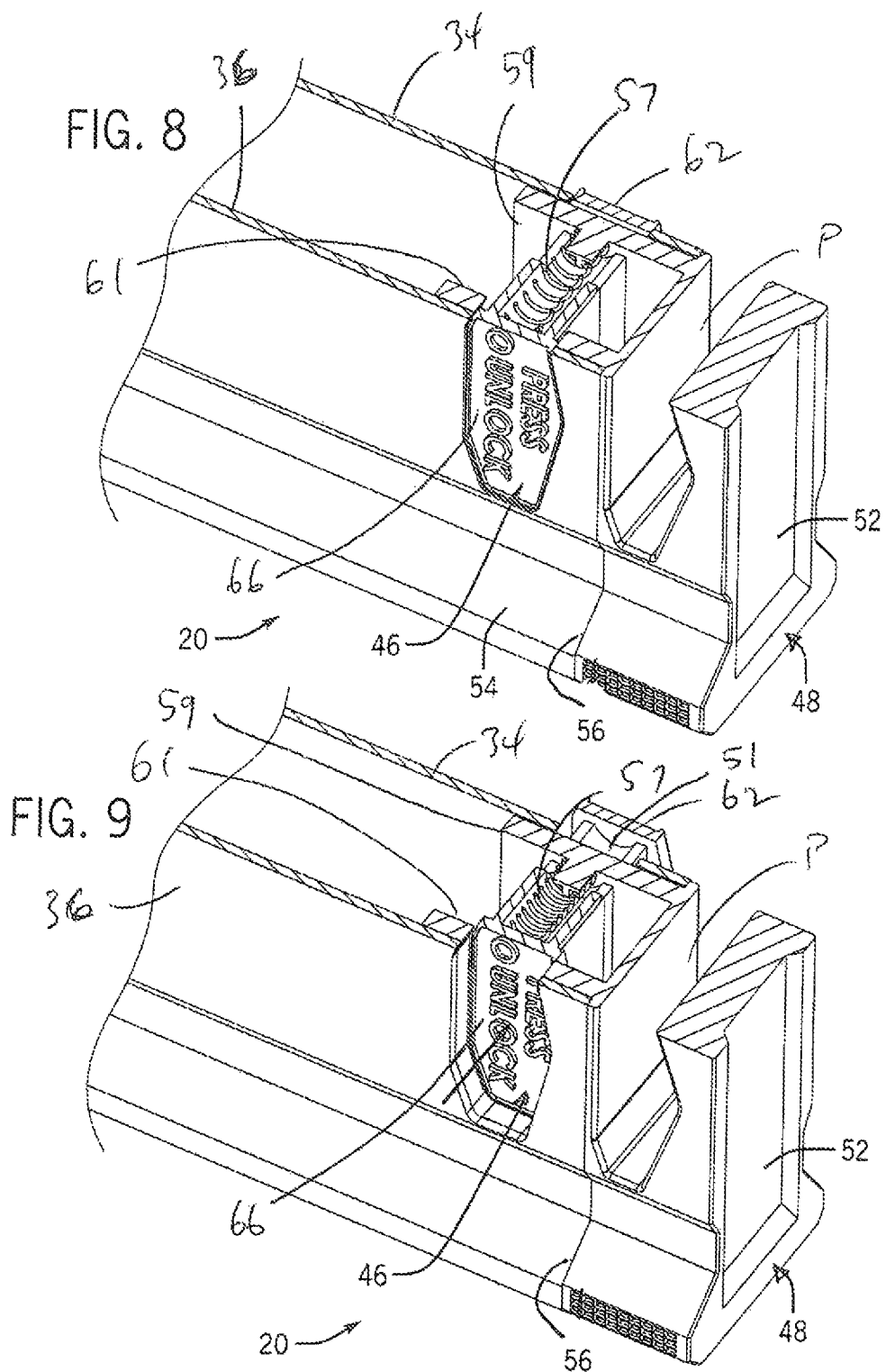

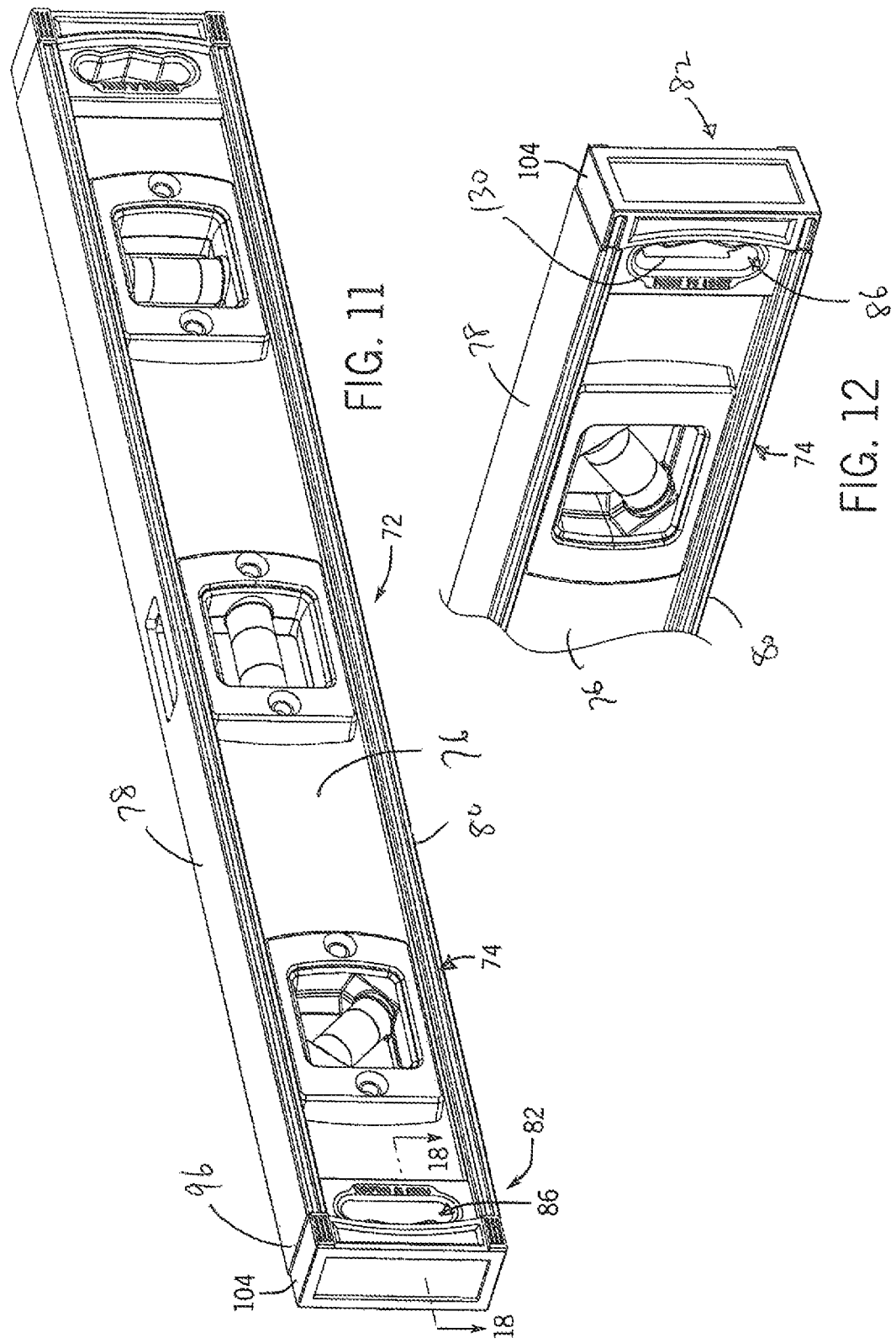

REMOVABLE END CAP ASSEMBLY FOR A LEVEL

CROSS REFERENCE TO RELATED APPLICATION

This application claims priority from U.S. Provisional Patent Application No. 62/045,230, filed Sep. 3, 2014, the subject matter of which is incorporated by reference in its entirety.

BACKGROUND AND SUMMARY

This invention relates to a tool such as a level, and more particularly to a removable end cap feature for a level.

A level generally includes at least one bubble vial secured to an elongate frame. The frame may be constructed of metal, plastic, organic material (e.g., wood), or other rigid material, and has a cross section that may vary between and within models, but commonly is in the form of either a box beam having a generally rectangular cross-section or an I-beam having an I-shaped cross-section. Alternatively, the frame may have other forms suitable for specific applications (e.g., an angular frame for leveling pictures or posts). The bubble vial indicates the orientation of the level, e.g., relative to a horizontal, vertical, or a diagonal plane. The vial contains a quantity of fluid and a bubble, and the user views the position of the bubble within the vial to ascertain the position of the tool relative to the desired plane. A level may also include other satisfactory means for indicating the orientation of the level relative to a plane, such as an electronic indicator or the like.

A level typically has end caps secured to the end of the frame, which serve to protect the ends of the level since the level may be subjected to rough operating and storage conditions, e.g., on a construction site. One drawback of level end caps is that they prevent the level gauging surface from reaching all the way to a wall that defines a corner, which is disadvantageous when it is desired to use the gauging surface to draw a line all the way into the corner.

It is therefore an object of the present invention to provide an end cap for a level that can be fastened to and removed from the frame by a user simply and quickly and without the use of additional materials and special tools, and without removing any pieces and parts from the level or the end cap.

In accordance with one aspect of the invention, a tool such as a level includes an elongate frame with two ends. The frame defines at least one gauging surface, and has a cross section that may vary between embodiments and may also vary along the length of the frame. As noted previously, common cross sections typically include a box beam cross section and an I-beam cross section. Embodiments with a box beam cross section have a frame with spaced-apart first and second walls, both of which may extend substantially parallel to each other along the elongate axis of the frame and at an angle relative to the gauging surface. Rather than first and second walls, embodiments with an I-beam cross section have a web that extends between an upper flange and lower a flange along the longitudinal axis of the frame and at an angle relative to the gauging surface.

One or more recesses extend through the frame near each end. The one or more recesses generally lie in a plane that contains one of the first and second walls (e.g., in the case of box beam embodiments) or the web (e.g., in the case of I beam embodiments). The one or more recesses are sized to receive a sliding retainer carried by the end cap, which is movable between an engaged position that selectively secures the end cap to the frame, and a release position that selectively enables the end cap to be removed from the frame. At least one of the recesses includes capture protrusions that are engaged by the retainer when in the engaged position to prevent disengagement of the end cap, as more fully described below.

The one or more capture protrusions, which may be defined by one or more indentations associated with the recess, are configured to engage the sliding retainer when the sliding retainer is in the engaged position in order to prevent removal of the end cap from the frame. When the sliding retainer is moved to the release position within an opening defined by the end cap, clearance structure on the sliding retainer is positioned in alignment with the one or more capture protrusions such that the end cap can be moved past the capture protrusions and removed from the frame by application of an axial outward force on the end cap. The end cap can subsequently be secured to the end cap by moving the sliding retainer to the release position and applying an axial inward force on the end cap, which enables the clearance structure on the end cap to move past the one or more capture protrusions. The sliding retainer is then returned to the engaged position to releasably secure the end cap to the end of the frame.

The end cap includes a main cap body and the sliding retainer. The main cap body may be constructed of any single material or combination of rugged materials, such as a rubber or plastic capable of absorbing impacts and limiting energy transfer to other components. Furthermore, the main cap body may be constructed as a single part or an assembly of sub-parts, and may be fully or partially hollow to conserve materials usage and cost, reduce weight, or to provide functional interior surfaces that cooperate with other structure, such as the sliding retainer.

The main cap body includes an inner portion that overlaps the end portion of the frame and an outer portion that projects outwardly from the end of the frame. In one embodiment, the main cap body includes a shoulder that fixes the position of the main cap body relative to the frame.

The outer portion of the main cap body may have any number of geometries and shapes, and representatively may have a shape that allows the entire level assembly to lie flat on any of its elongate sides. The outer portion may also feature apertures (e.g., to facilitate carrying or hanging the level on a hook), recesses, textures (e.g., to facilitate gripping), or other useful characteristics.

The sliding retainer is movably positioned within the opening of the end cap, and generally has an engaged position and a release position, as noted previously. When the end cap is engaged with the frame and the sliding retainer is in the engaged position, the end cap may not be disengaged from the frame. Conversely, when the end cap is engaged with the frame and the sliding retainer is in the release position, the end cap may be removed from the frame.

For ease of assembly, the sliding retainer may be in the form of a pair of retainer subsections that are positioned within the opening from opposite sides defined by the end cap, and which are configured for engagement with each other to so as to form the sliding retainer.

The sliding retainer may include a biasing mechanism to urge it toward the engaged position, which facilitates operation and also prevents inadvertent movement of the sliding retainer to the release position that could result in the unintentional disengagement of the end cap. The biasing mechanism may be any satisfactory configuration, and in one embodiment may be in the form of a spring interposed between the sliding retainer and the main cap body that urges the sliding retainer toward the engaged position.

Various other features, objects and advantages of the invention will be made apparent from the following description taken together with the drawings. Although the removable end cap assembly is described in the context of a level, it should be understood that it could also perform a useful function in other applications, such as squares, straight edges, in relation to handles (e.g., on tools), in relation to posts or poles (e.g., in shelving assemblies), and other applications not specifically mentioned herein.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which:

FIG. 1 is an isometric view of a first embodiment of a level, in which the level frame has a box beam construction, having one or more removable and caps in accordance with the present invention; showing the end caps engaged with the frame of the level;

FIG. 2 is a partial isometric view of one end of the level of FIG. 1 showing the removable end cap in engagement with the level frame;

FIGS. 3 and 4 are enlarged partial isometric views from opposite sides of the end of the level as illustrated in FIG. 2, showing movement of the sliding retainer toward a release position in order to enable the end cap to be removed from the level frame;

FIGS. 6 and 7 are enlarged exploded isometric views from opposite sides of the end cap as shown in FIG. 5 showing the components of the removable end cap assembly;

FIG. 8 is a partial section view with reference to line 8-8 of FIG. 1, showing the sliding retainer of the removable end cap in the engaged position;

FIG. 9 is a view similar to FIG. 8, showing movement of the sliding retainer to the release position;

FIG. 11 is an isometric view of second embodiment of a level, in which the level frame has an I-beam construction, having one or more removable and caps in accordance with the present invention, showing the end caps engaged with the frame of the level;

FIG. 12 is a partial isometric view of one end of the level of FIG. 11 showing the removable end cap in engagement with the level frame;

FIGS. 21 and 22 are end elevation views of the removable end cap incorporated in the embodiment illustrated in FIG. 11-20, in which FIG. 20 illustrates the sliding retainer in the engaged position and FIG. 22 illustrates the sliding retainer in the release position.

Figure 5:
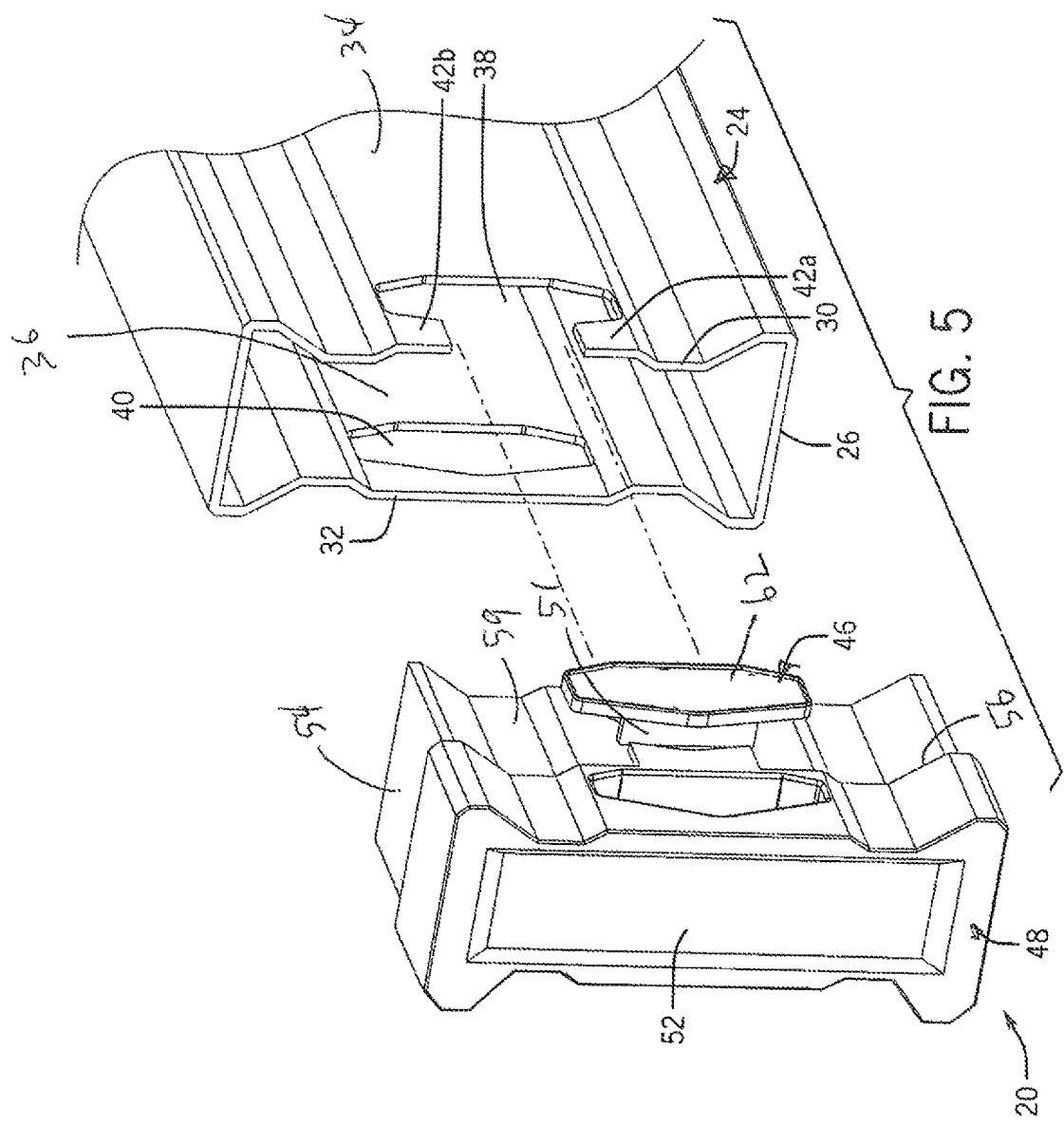
FIG. 5 is an enlarged partial isometric view similar to FIG. 4 and showing removal of the end cap from the level frame.
Figure 10:
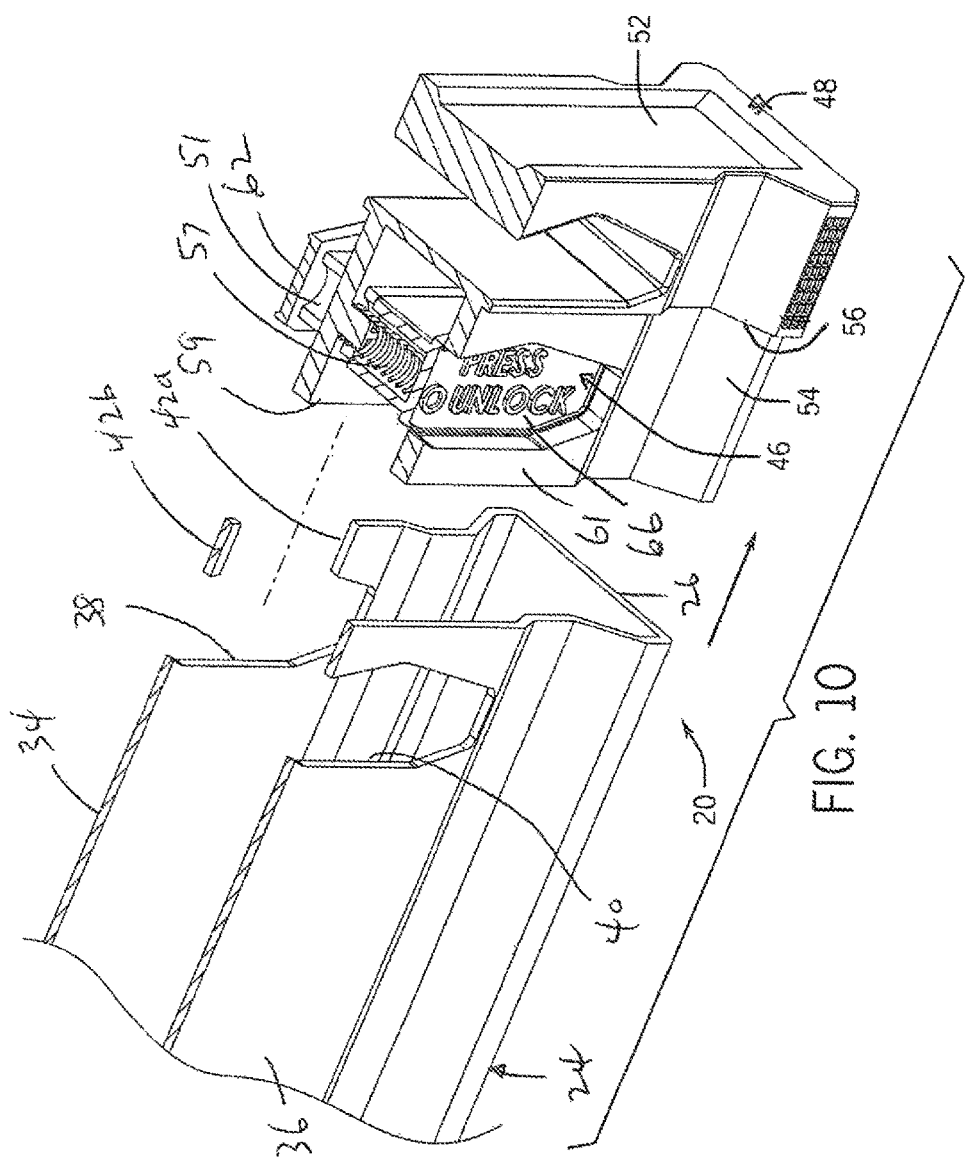
FIG. 10 is a view similar to FIGS. 8 and 9, showing disengagement of the end cap from the level frame when the sliding retainer is in the release position.
Figure 13:
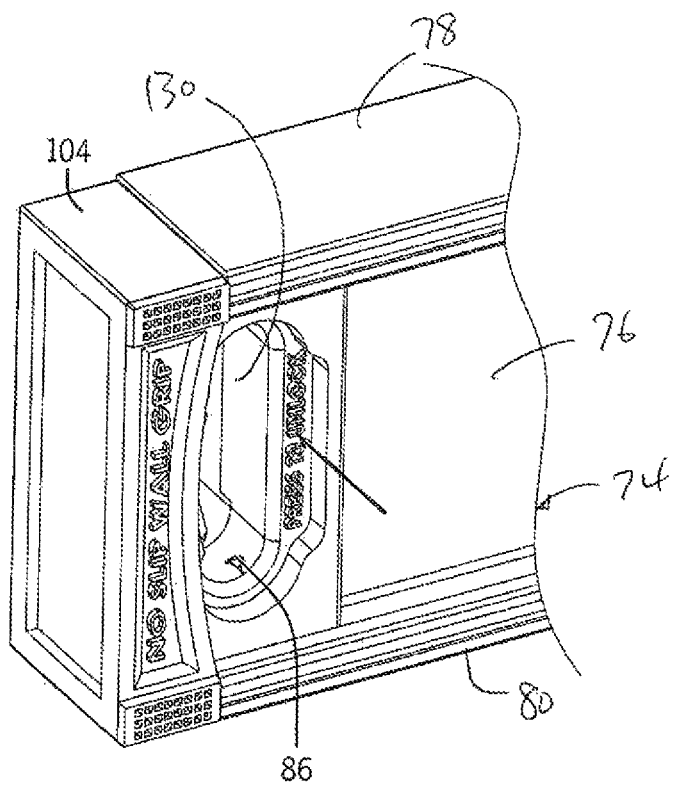
FIGS. 13 and 14 are enlarged partial isometric views from opposite sides of the end of the level as illustrated in FIG. 12, showing movement of the sliding retainer toward a release position in order to enable the end cap to be removed from the level frame.
Figure 14:
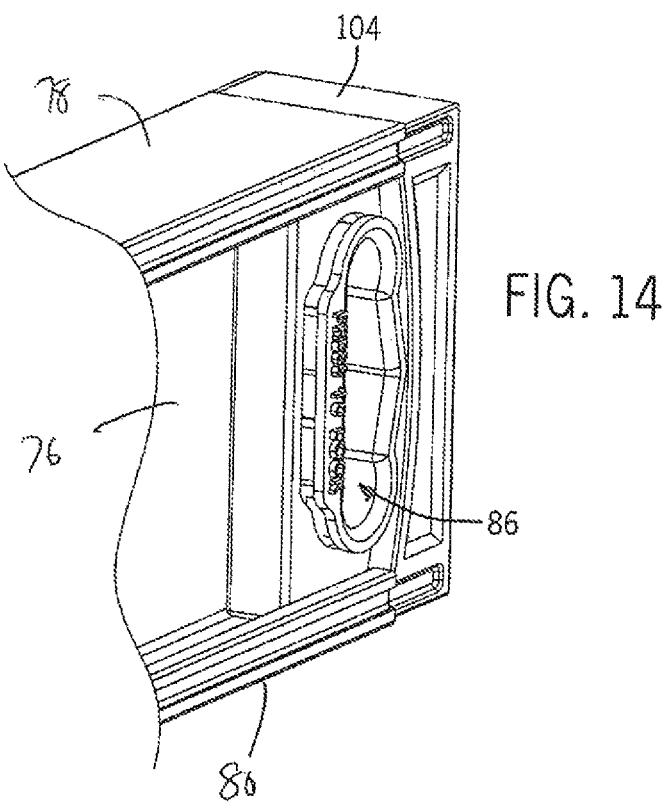

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DETAILED DESCRIPTION

Specific embodiments of the present invention will be described by the following non-limiting examples which will serve to illustrate various features of the invention.

With reference to the drawing figures in which like reference numerals designate like parts throughout the disclosure, a representative first embodiment of the present invention is illustrated in FIGS. 1-10 in the form of a removable end cap assembly shown generally at 20 coupled with a level 22, which includes an elongate box beam-type frame 24 with a closed polygonal cross section and a first end 26 and a second end 28, either of which end may be provided a removable end cap 20 accordance with the present invention. Level 22 may include one removable end cap 20 in cooperation with each end 26, 28, or alternatively with only one of the ends of the frame 24.

When viewed along the elongate axis with end cap 20 removed, it can be seen that frame 24 includes a first end edge 30 and an opposing second end edge 32 at first end 26, which correspond to a first side wall 34 and an opposing second side wall 36, respectively. First and second side walls 34, 36 extend between and interconnect the top and bottom walls of frame 24, which define respective top and bottom gauging surfaces, in a manner as is known. It can be appreciated that first and second end edges 30, 32 could alternatively correspond to other opposing walls of the cross section of frame 24 other than those that define the level gauging surfaces.

With reference to FIGS. 2 and 5, an open first recess 38 extends normally through first side wall 34 proximate frame end 26, and a closed second recess 40 extends through second side wall 36 in transverse alignment with first recess 38. First recess 38 also extends through first edge 30, thereby opening onto frame end 26. First recess 38 is shaped to create engagement structure in the form of capture protrusions 42a, 42b that project inwardly toward each other in the plane containing first side wall 34. Capture protrusions 42a, 42b selectively arrest the movement of a sliding retainer 46, as more fully described below. Second recess 40 extends through second side wall 36, but does not extend through second edge 32 (i.e., it does not open onto frame end 26).

With reference to FIGS. 2-7, end cap 20 includes a main cap body 48 that houses the sliding retainer 46. Main cap body 48 includes an outer portion 52 and an inner portion 54, separated by a shoulder 56. Outer portion 52 may be provided with a passage P, which may function as a hang hole or finger grip, in a manner as is known. When end cap 20 is coupled with frame 24, as shown in FIG. 1, frame 24 slidably receives inner portion 54 and hides it from view, while outer portion 52 visibly projects from frame end 26. Shoulder 56 engages the end surfaces such as 30, 32 of frame 24 at first end 26, to fix the axial position of end cap 20 relative to frame 24. Inner portion 54 of main cap body 48 features a cross section that is similar to but dimensionally smaller than the cross section of frame 24, such that the surfaces of main cap body 48 do not interfere with the gauging surfaces of frame 24. Inner portion 54 is dimensioned to achieve a snug fit when received by frame 24. Main cap body 48 includes a pair of inner walls 59, 61, within which aligned transverse openings 58 are formed, and which are sized to receive sliding retainer 46. Openings 58 are aligned with recesses 38, 40 when the end cap 20 is coupled with frame 24.

Again with reference to FIGS. 2-7, sliding retainer 46 has a first end 60 and a second end 66, and is receivable by main cap openings 58 and frame recesses 38, 40. The user may move sliding retainer 46 between an engaged position (FIGS. 1, 2 and 8) and a release position (FIGS. 3, 4, 5, 9 and 10). As will be explained sliding retainer 46 selectively prevents end cap 20 from being removed from frame 24. To accomplish this, main cap openings 58 and frame recesses 38, 40 receive first and second ends 60, 66, respectively, of sliding retainer 46. In operation, sliding retainer 46 remains within main cap opening 58, although a user can selectively position sliding retainer 46 relative to frame recesses 38, 40 so as to selectively enable a user to remove end cap 20.

Referring to FIGS. 6-9, sliding retainer 46 comprises a pair of retainer sections shown generally at 47, 49. End 62 is provided on retainer section 47, and end 66 is provided on retainer section 49. In addition to end 62, retainer section 47 further includes guide structure 51 that extends inwardly from end 62. Guide structure 51 has a shape corresponding to and slightly smaller than opening 58 in main cap wall 59, and is configured to slide inwardly and outwardly within opening 58 when sliding retainer 46 is moved between its engaged and disengaged positions. Retainer section 49 includes structure that extends inwardly from end 66 in the form of a pair of spring mounting cylinders 53 between which an engagement surface 55 extends. Engagement surface 55 is a shape corresponding to the end of guide structure 51. With this construction, retainer sections 47, 49 can be secured together, such as by adhesive or sonic welding, onto end cap main body 48.

Springs 57 are received within spring mounting cylinders 53 of retainer section 49. Openings 58 in end Wall 61 is shaped so as to enable end 66 of sliding retainer 46 to move inwardly and outwardly relative to main cap wall 61. Main cap wall 59 includes bosses 63 with which the outer ends of springs 57 are engaged, so as to maintain springs 57 in position when sliding retainer sections 47, 49 are secured together. In this manner, springs 57 function to bias sliding retainer 46 toward the engaged position as shown in FIGS. 1, 2 and 8. The inner surfaces of end 62 of sliding retainer 46 engage main cap wall 59 adjacent opening 58 and function as a stop when sliding retainer 46 is in the engaged position. Sliding retainer sections 47, 49 are configured and dimensioned such that, when sliding retainer 46 is in the engaged position, end 66 is positioned flush within opening 40 in frame side wall 36. Similarly, when sliding retainer 46 is in the engaged position, end 62 is positioned flush within opening 38 in frame side wall 34. It can thus be appreciated that, with end 62 within opening 38, the protrusions 42a, 42b defined by frame side wall 34 adjacent opening 38 engage the facing surfaces of end 62 so as to prevent relative axial movement between frame 24 and end cap 20, in order to releasably secure end cap 20 to frame 24.

To enable the user to disengage removable end cap 20 from frame 24, the user depresses end 66 of sliding retainer 46 so as to move sliding retainer 46 laterally against the force of springs 57, away from the engaged position of sliding retainer 46. This movement of sliding retainer 46 functions to move end 66 inwardly out of opening 40 in frame side wall 36 and into and through opening 58 in main cap wall 61, and at the same time advance end 62 outwardly relative to opening 38 in frame side wall 34. The disengaged position of sliding retainer 46 is illustrated in FIGS. 3, 4, 5, 9 and 10. With sliding retainer 46 in the disengaged position, end 62 is moved out of opening 38 in frame side wall 34 and is positioned such that guide structure 51 of retainer section 47 is in axial alignment with the space defined between protrusions 42a, 42b. Guide structure 51 has a height that is less than the distance between the ends of protrusions 42a, 42b. Accordingly, the user can apply an axial outward force on end cap 20 when sliding retainer 46 is in the disengaged position in order to remove end cap 20 from level frame 24. During such downward movement, guide structure 51 is moved axially through the space between protrusions 42a, 42b, while at the same time the retraction of end 66 prevents interference with frame side wall 36. It can be appreciated that the user need only maintain the depressing force on end 66 of sliding retainer 46 until end cap 20 is moved upwardly and are not sufficient to create a degree of overlap between end 66 and frame side wall 36 adjacent opening 40. The user can then release the depressing force. Springs 57 bias end 66 into engagement with the inner surface of frame side wall 36 during continue downward movement of end cap 20. However, sliding retainer 46 is dimensioned so that even accounting for such movement end 62 remains clear of opening 38 to enable end cap 20 to be removed. After end cap 20 has been fully removed, the biasing force applied by springs 57 functions to return sliding retainer 46 to the engaged position. To re-engage end cap 20 with level frame 24, the user again depresses end 66 to move sliding retainer 46 to the disengaged position against the force of springs 57. End cap 20 can then be advanced into engagement with frame 24 in a reverse manner to that described above. Once end cap 20 is advanced sufficiently so as to overlap end 66 with side wall 36 inwardly of edge 32, the user releases the depressing force on end 66 and continues inward advancement of end cap 20. When end cap 20 is fully advanced to the engaged position in which shoulder 56 contacts the end edges of frame 24, end 62 of sliding retainer 46 is positioned in alignment with opening 38 in frame side wall 34 and end 66 of sliding retainer 46 is positioned in alignment with opening 40 in frame side wall 36. Springs 57 then act to move sliding retainer 46 to the engaged position so as to again secure end cap 20 two level frame 24. This construction and biased operation of sliding retainer 46 provides an audible and tactile snap-type engagement when end cap 20 is secured to level frame 24.

It can be appreciated that, while a spring-biased construction and operation of sliding retainer 46 is shown and described, it is also contemplated that sliding retainer 46 may be moved between the engaged and disengaged positions manually without assistance from a spring or any other biasing mechanism.

FIGS. 11-22 illustrate a second embodiment of the present invention, in the form of a removable end cap arrangement for an I-beam type level. As shown in FIGS. 11-16, a level 72 includes an elongate frame 74 with an open I-beam cross section, including a web 76 spanning between an upper flange 78 and a lower flange 80. Level 72 includes an end cap 82 with a main cap body 84 and a sliding retainer 86. In the illustrated embodiment, web 76 is oriented perpendicular to flanges 78, 80, although it is understood that web 76 may be oriented at any other desired angle. When viewed along the elongate axis with end cap 82 removed, an edge 88 corresponding to an end 96 of frame 74 is revealed. Each of web 76 and flanges 78, 80 have thicknesses that may vary.

Figure 15:
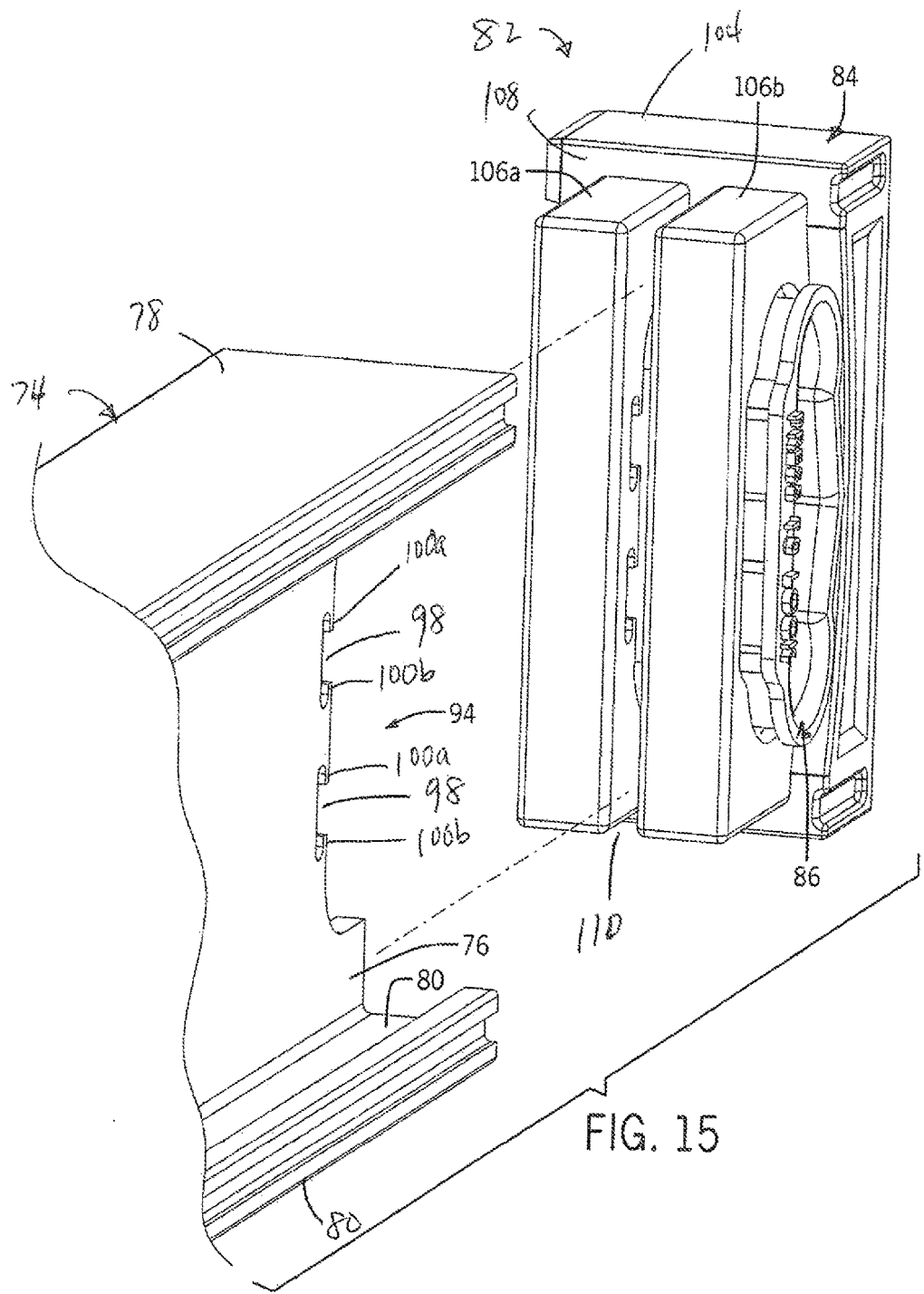
FIG. 15 is an enlarged partial isometric view similar to FIG. 14 and showing removal of the end cap from the level frame.
Figure 16:
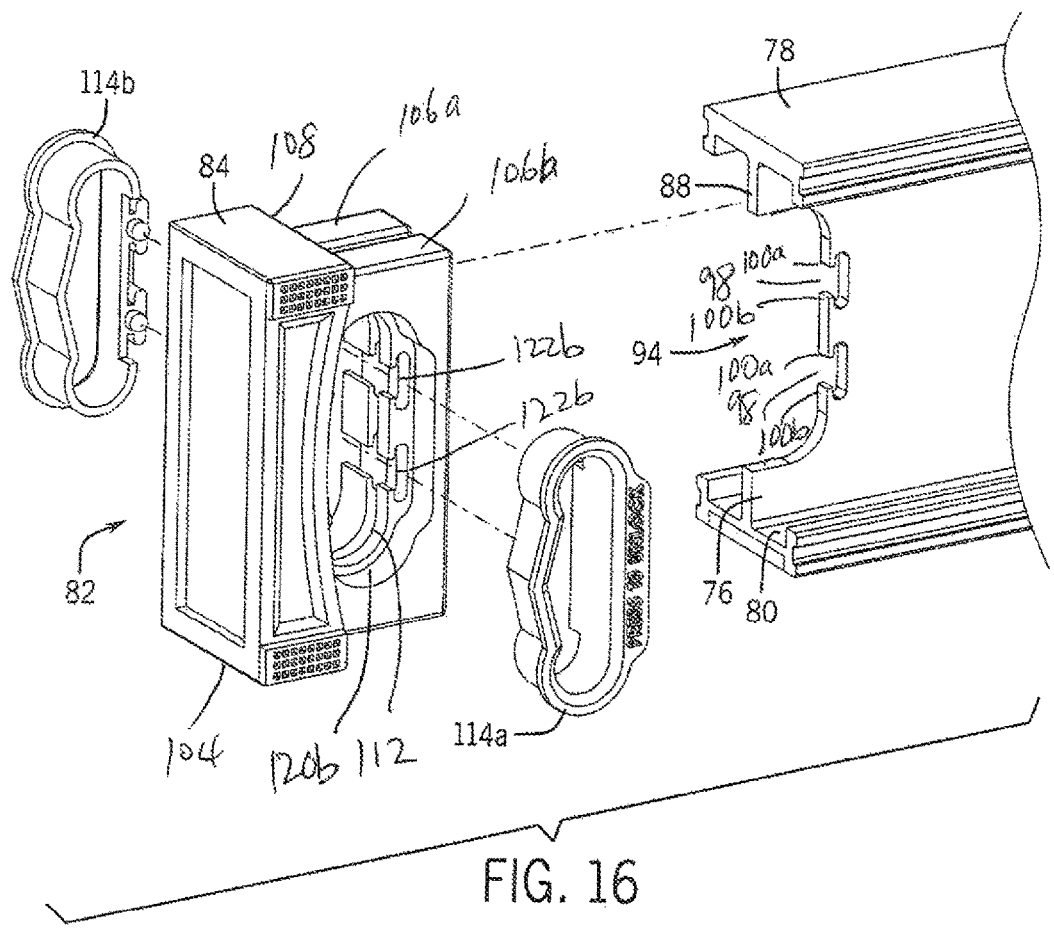
FIGS. 16 and 17 are enlarged exploded isometric views from opposite sides of the end cap as shown in FIG. 15 showing the components of the removable end cap assembly.
Figure 17:
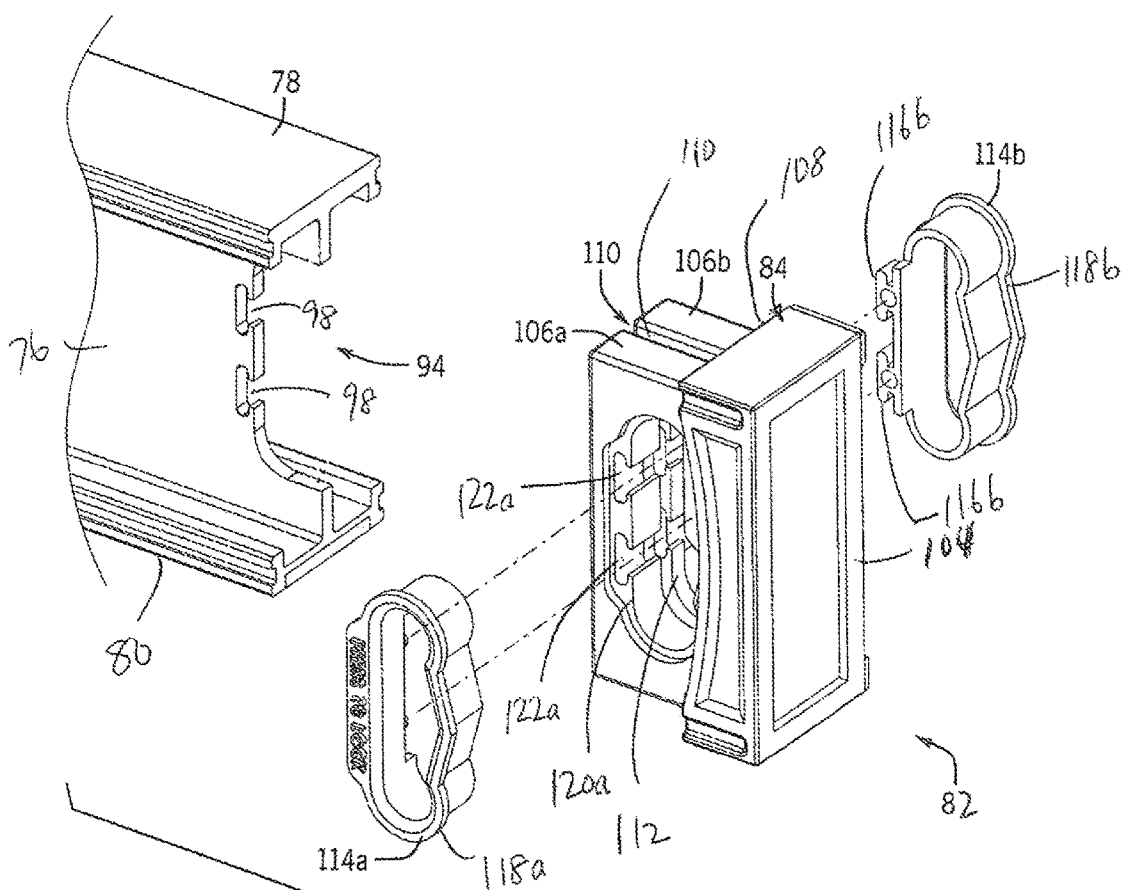

As illustrated in FIGS. 15-17, an opening or recess 94 extends normally through web 76 and edge 88, opening onto frame end 96. Recess 94 includes a pair of channels 98, each of which has an undercut configuration that defines engagement structure in the form of a pair of spaced-apart protrusions 100a, 100b forming a restricted entrance to each channel 98. The protrusions 100a, 100b are located axially inwardly from end 96 and extend toward each other, and are separated by a space.

Main cap body 84 includes an outer portion 104 separated from two inner portions 106a, 106b by a shoulder 108. Inner portions 106a, 106b are separated by a slot 110. Slot 110 has a width slightly greater than the thickness of web 76, which enables end cap 82 to slide onto frame end 96 such that inner portions 106a, 106b are located adjacent oppositely facing side surfaces of web 76. In this coupled configuration, lips on upper and lower flanges 78, 80 may be positioned so as to overlie inner portions 106a, 106b of main cap body 84, to assist in securing its position relative to frame 74. A transverse opening 112 through main cap body 84 receives sliding retainer 86.

With reference to FIGS. 16-23, sliding retainer 86 may be in the form of a pair of sliding retainer sections 114a, 114b engageable within opening 112 of main cap 84 and secured together. Sliding retainer sections 114a, 114b are secured together, such as by adhesive, sonic welding, etc., and are moveably positioned within web recess 94 when engaged within main cap opening 112, and are engaged together to form a unified sliding retainer 86. Sliding retainer 86 is moveable between a release position and an engaged position, which is controlled by selective lateral movement of sliding retainer 86 within end cap opening 112 and relative to frame recess 94. In a manner to be explained, sliding retainer sections 114a, 114b include retainer structure that is configured for selective engagement with protrusions 100a, 100b of recesses 98 for selectively securing end cap 84 to frame 74.

Figure 23:
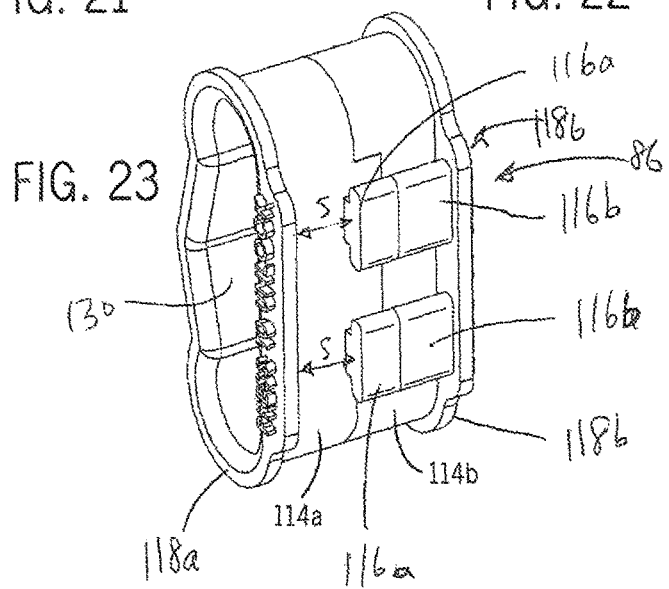
FIG. 23 is an isometric view of the sliding retainer incorporated in the embodiment illustrated in FIGS. 11-22.

As shown in FIGS. 16, 17 and 23, retainer section 114a has a pair of spaced-apart T-shaped retainer members 116a and retainer section 114b has a pair of spaced apart T-shaped retainer members 116b. The retainer members 116a of retainer section 114a align with and engage the retainer members 116b of retainer section 114b when retainer sections 114a and 114b are secured together. The retainer members 116b of retainer section 114b extend throughout the depth of retainer section 114b, whereas the retainer members 116a retainer section 114a extend throughout only a portion of the depth of retainer section 114a. Retainer section 114a includes a peripheral lip 118a, and similarly retainer section 114b includes a peripheral lip 118b. Retainer members 116b of retainer section 114b extend inwardly from the inner surface of lip 118b. Retainer members 116a of retainer section 114a, however, terminate at a location spaced from the inner surface of lip 118a. in this manner, a clearance space S is defined between the inner surface of lip 118a and the facing ends of retainer members 116a.

Referring to FIGS. 16 and 17, opening 112 in end cap 82 defines a shoulder 120a adjacent the outer side surface of end cap inner portion 106a, and likewise defines a shoulder 120b adjacent the outer side surface of end cap inner portion 106b. In addition, opening 112 defined pair of spaced-apart T-shaped slots 122a in inner portion 106a, and similarly defines a pair of spaced-apart T-shaped slots 122b in inner portion 106b. The slots 122a and 122b are aligned with each other, with the space 110 between the portions 106a and 106b located therebetween. When end cap 84 is engaged with frame 74, slots 122a and 122b are in transverse alignment with channels 98 in frame web 76. The T-shaped retainer members 116a and 116b of sliding retainer 86 are configured such that they are received within, and movable within, the aligned web channels 98 and T-shaped slots 122a, 122b.

In the illustrated embodiment, the retainer members 116a and 116b and slots 122a and 122b are shown as having a generally T-shaped configuration. It is understood, however, that any other satisfactory configuration may be employed. Generally, however, the retainer members or structure are in the form of a irregularly shaped tabs or the like that are received within corresponding irregularly shaped slots or the like.

In the illustrated embodiment, sliding retainer 86 includes a transverse passage 130, which functions as a hang hole, finger grip or the like. It is understood, however, that sliding retainer 86 may alternatively have a solid cross-section without a transverse opening or passage.

Figure 18:
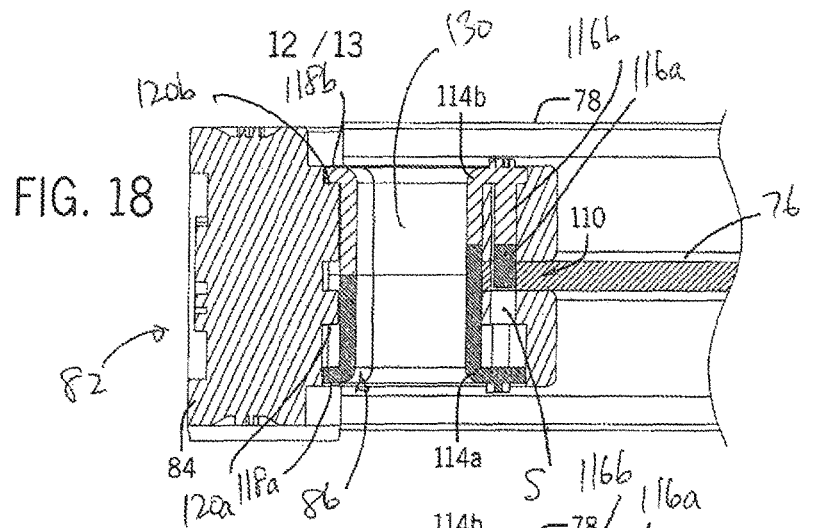
FIG. 18 is a partial section view with reference to line 18-18 of FIG. 11, showing the sliding retainer of the removable end cap in the engaged position.
Figure 19:
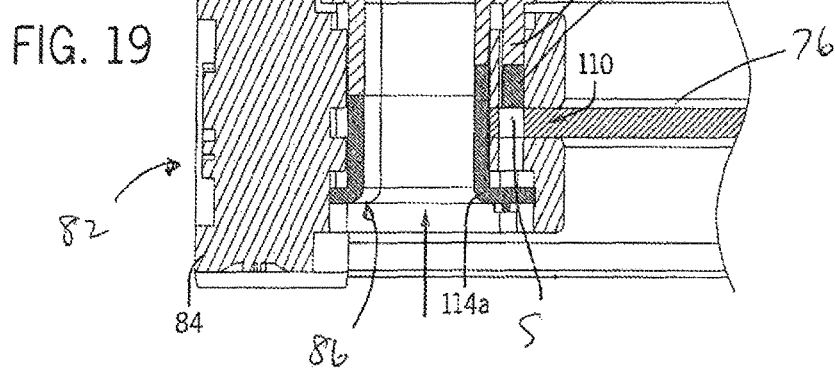
FIG. 19 is a view similar to FIG. 18, showing movement of the sliding retainer to the release position.
Figure 20:
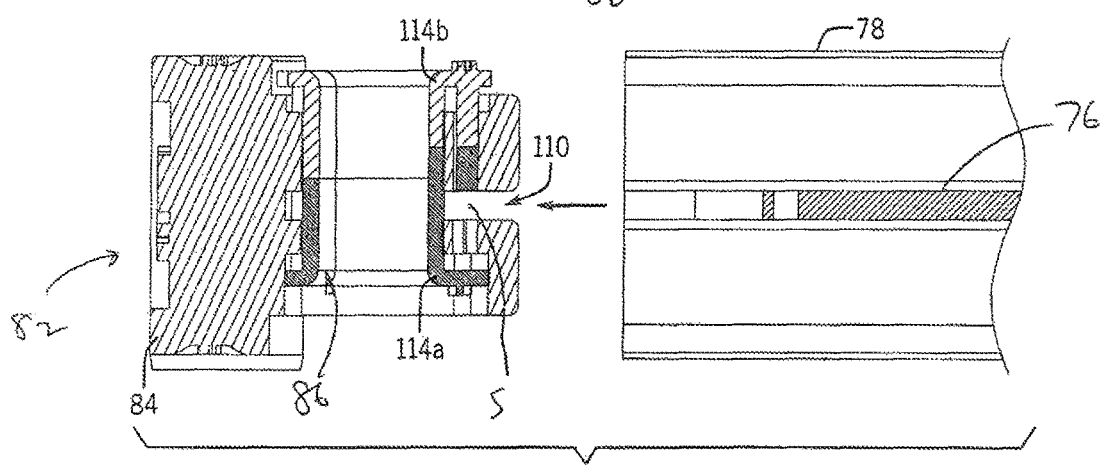
FIG. 20 is a view similar to FIGS. 18 and 19, showing disengagement of the end cap from the level frame when the sliding retainer is in the release position.
Figure 21:
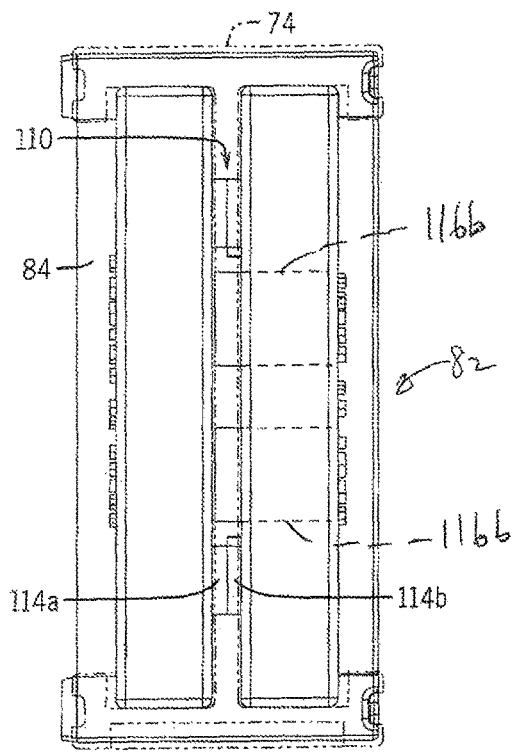
Figure 22:
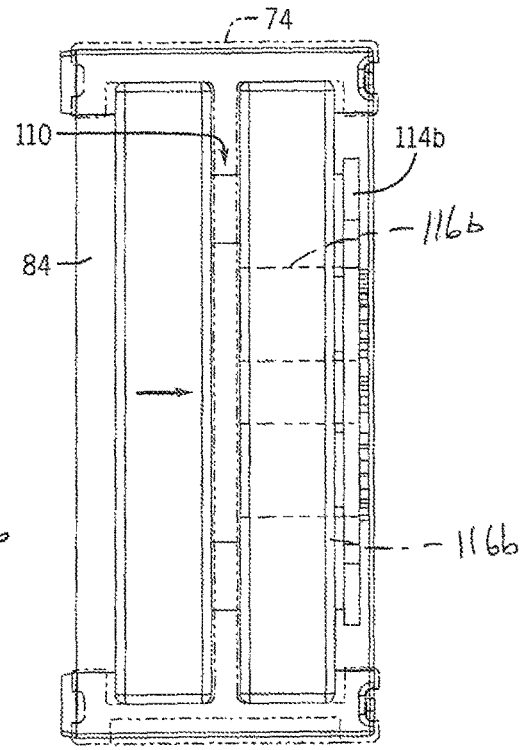

In operation, when end cap 84 is engaged with frame 74, the sliding retainer 86 of end cap 82 is positioned within opening 112 in an engaged position in which lip 118b of retainer section 114b is engaged with shoulder 120. This engaged position of sliding retainer 86 is illustrated in FIGS. 12, 18 and 21. The T-shaped retainer members 116a and 116b are engaged within the T-shaped slots 122a and 122b, as well as within the channels 98 so as to underlie protrusions 100a and 100b. Retainer members 116a and 116b thus function to lock end cap 82 to the end of level frame 74. When it is desired to remove the end cap 82, the user applies a transverse depressing force to lip 118a of sliding retainer 86, which causes lateral movement of sliding retainer 86 within end cap opening 112 and relative to frame web 76. Continued lateral movement of sliding retainer 86 places sliding retainer 86 in a release or disengaged position, in which retainer members 116a and 116b are moved out of channels 98 in frame web 76 and the space S (FIG. 23) of sliding retainer 86 is located in axial alignment with frame web 76. This position of sliding retainer 86 is illustrated in FIGS. 13-15, 19, 20 and 22. When sliding retainer 86 is in the release or disengaged position, the user can apply an axial outward force on the end cap 82 so as to remove it from the end of level frame 74. When it is desired to subsequently engage end cap 82 with the end of level frame 74, the above steps are reversed such that subsequent positioning of retainer members 116*a* and 116*b* within slots 122*a*, 122*b* and channels 98 secures end cap 82 to the level frame 74.

Lateral movement of sliding retainer 86 within opening 112 of end cap 82 is controlled by engagement of lips 118*a*, 118*b* with shoulders 120*a*, 120*b*, respectively.

While sliding retainer 86 is illustrated as remaining in place when moved to either the engaged or disengaged position, it is also contemplated that a biasing mechanism may be employed to maintain it in the engaged position, in generally the same manner as described in connection with the embodiment of FIGS. 1-10.

It can thus be appreciated that the present invention provides a removable end cap assembly for a level that is relatively simple in construction and easy to operate, but that provides secure engagement with the level frame when in an engaged position and that can be quickly and easily remove when desired. The removable end cap assembly has no separate pieces or parts that can easily be lost or misplaced, but rather incorporates a unique, unitary retainer configuration in the end cap itself that is selectively engageable with engagement structure on the level frame.

It can also be appreciated that, while the level frame and sliding retainer have been shown and described with certain configurations of engagement structure, various other engagement structure and retainer structure configurations may be employed. Generally, however, the engagement structure on the level frame is formed so as to have an opening or passage onto the end of the level frame and irregularly shaped slots, indentations or recesses and the retainer structure on the sliding retainer has corresponding irregularly shaped retainer members or structure. When the sliding retainer is in the engaged position, the retainer structure is received or positioned within the engagement structure and the end cap cannot be removed. When the sliding retainer is moved to the disengaged or release position, the retainer structure is moved to a position where it is clear of the engagement structure on the level frame and can be moved through the opening or passage in order to enable the end cap to be removed.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A level, comprising:
   a frame extending along a longitudinal frame axis and defining an end;
   an opening located adjacent the end of the frame, wherein the frame and the opening define a passage and also define engagement structure located adjacent the passage;
   an end cap engageable with the frame and having a portion that is configured to overlie the opening; and
   a releasable engagement arrangement engaged with and carried by the end cap, wherein the releasable engagement arrangement is positioned within the opening, and wherein the releasable engagement arrangement includes retainer structure that is movable relative to the end cap and relative to the frame in a direction transverse to the longitudinal frame axis between an engaged position and a release position, wherein in the engaged position the retainer structure is positioned relative to the engagement structure to maintain the end cap in engagement with the frame, and wherein in the release position the retainer structure is positioned relative to the engagement structure to enable a portion of the releasable engagement arrangement to pass through the passage upon application of an axial outward force to the end cap in order to enable the end cap to be removed from the frame, wherein the releasable engagement arrangement remains engaged with the end cap both when the end cap is engaged with the frame and when the end cap is removed from the frame.

2. The level of claim 1, wherein the end cap defines a transverse passage extending transversely relative to the longitudinal frame axis when the end cap is engaged with the frame, and wherein the releasable engagement arrangement is movable in the transverse direction within the transverse passage between the engaged and release positions.

3. The level of claim 2, wherein the releasable engagement arrangement is slidably movable within the transverse passage in the transverse direction between the engaged and release positions.

4. The level of claim 3, wherein the engagement structure comprises one or more protrusions defined by the frame opening and located adjacent the passage, wherein the retainer structure on the releasable engagement arrangement engages the one or more protrusions when the releasable engagement arrangement is in the engaged position, and is moved out of engagement with the one or more protrusions when the releasable engagement arrangement is in the release position.

5. The level of claim 1, wherein the frame defines a pair of spaced apart walls, wherein the opening and the engagement structure are associated with a first one of the walls, and wherein a second one of the walls includes a second opening within which a portion of the releasable engagement arrangement is positioned.

6. The level of claim 5, wherein the end cap includes an inner portion configured for positioning within an internal passage defined by the level frame between the pair of spaced apart walls, and wherein the releasable engagement arrangement is movably mounted to the inner portion for movement between the engaged position and the release position.

7. The level of claim 1, wherein the frame defines a web that extends between a pair of spaced apart flanges, wherein the opening and the engagement structure are associated with the web, and wherein the releasable engagement arrangement comprises a retainer that is slidably movable relative to the end cap in the transverse direction between the engaged and released positions.

8. The level of claim 7, wherein the opening and the engagement structure define one or more protrusions and wherein the retainer includes one or more retainer members that are engageable with the one or more protrusions when the retainer is in the engaged position.

9. A level, comprising:
   a frame extending along a longitudinal frame axis and defining an end and further defining a pair of spaced apart frame walls;
   an opening located adjacent the end of the frame, wherein the frame and the opening define a passage and also define engagement structure located adjacent the passage, and wherein the opening and engagement structure are associated with a first one of the frame walls, and wherein a second one of the frame walls includes a second opening;

an end cap engageable with the frame and having a portion that is configured to overlie the opening, wherein the end cap includes an inner portion configured for positioning within an internal passage defined by the level frame between the pair of spaced apart frame walls; and a releasable engagement arrangement carried by the end cap, wherein the releasable engagement arrangement is positionable within the opening and has retainer structure that is movably mounted to the inner portion of the end cap and relative to the frame between an engaged position and a release position, wherein in the engaged position the retainer structure is positioned relative to the engagement structure to prevent removal of the end cap from the frame, and wherein in the release position the retainer structure is positioned relative to the engagement structure to enable a portion of the releasable engagement arrangement to pass through the passage upon application of an axial outward force to the end cap inn order to remove the end cap from the frame, wherein the releasable engagement arrangement comprises a sliding retainer having a first portion positioned within the opening in the first frame wall and a second portion positioned within the second opening in the second frame wall when the sliding retainer is in the engaged position, and wherein the first portion is movable inwardly relative to the opening in the first frame wall and the second portion is movable outwardly relative to the second opening in the second frame wall when the sliding retainer is in the release position and wherein, when the sliding retainer is in the release position, the sliding retainer can be moved axially outwardly through the passage to disengage the end cap from the level frame.

10. A level, comprising:

a frame defining an end, wherein a recess extends inwardly from the end of the frame and defines engagement structure;

an end member configured for selective engagement with the end of the frame; and a movable retainer engaged with and carried by the end member, wherein the movable retainer is movable relative to the end member between an engaged position and a release position, wherein the movable retainer includes retainer structure that engages the engagement structure when in the engaged position so as to maintain engagement of the end member with the frame, and that is positioned out of engagement with the engagement structure when in the release position so as to enable removal of the end member from the frame, and wherein the movable retainer remains engaged with the end member both when the end member is engaged with the frame and when the end member is removed from the frame.

11. The level of claim 10, wherein the engagement structure comprises one or more protrusions and wherein the retainer structure comprises one or more retainer members that are engageable with the one or more protrusions when the movable retainer is in the engaged position.

12. The level of claim 11, wherein the movable retainer includes clearance structure that is positioned in alignment with the one or more protrusions when the movable retainer is in the release position.

13. The level of claim 12, wherein the clearance structure is associated with guide structure that guides movement of the movable retainer between the engaged and release positions.

14. A method of engaging an end member with a level frame, comprising the acts of:

providing a level frame extending along a longitudinal axis and having an end with a recess, wherein the recess includes one or more engagement protrusions;

providing an end member configured for engagement with the end of the level frame, wherein the end member includes a movable retainer that is engaged with the end member and movable in a direction transverse to the longitudinal axis of the level frame, wherein the movable retainer includes retainer structure;

positioning the movable retainer in a disengaged position, while the movable retainer remains engaged with the end member, and engaging the end member with the end of the level frame by moving the end member in the direction along the longitudinal axis of the level frame such that a portion of the end member overlies the recess; and moving the movable retainer to an engaged position, while the movable retainer remains engaged with the end member, in the direction transverse to the longitudinal axis of the level frame when the end member is engaged with the end of the level frame, wherein the act of moving the movable retainer in the direction transverse to the longitudinal axis of the level frame to the engaged position places the retainer structure of the movable retainer in engagement with the one or more protrusions so as to prevent movement of the end member in the direction along the longitudinal axis of the level frame and thereby disengagement of the end member from the level frame, wherein the movable retainer remains engaged with the end member during movement of the movable retainer between the engaged and disengaged positions both when the end member is engaged with the end of the level frame and when the end member is disengaged from the level frame.

15. The method of claim 14, wherein the act of moving the movable retainer in the direction transverse to the longitudinal axis of the level frame between the disengaged and engaged positions is carried out by lateral sliding movement of the movable retainer relative to the end member.

16. The method of claim 15, wherein the act of engaging the end member with the end of the level frame is carried out by advancing a portion of the movable retainer in the direction along the longitudinal axis of the level frame through passage structure associated with the opening and that defines the one or more engagement protrusions.

17. The method of claim 16, wherein the act of advancing the portion of the movable retainer in the direction along the longitudinal axis of the level frame through passage structure associated with the opening comprises moving the portion of the movable retainer past a pair of protrusions defined by the end of a wall of the level frame.

18. The method of claim 16, wherein the act of advancing the portion of the movable retainer in the direction along the longitudinal axis of the level frame through passage structure associated with the opening comprises moving the portion of the movable retainer past a pair of protrusions defined by an edge of the recess.

* * * * *